(No Model.)

A. BREUER.
FILTER.

No. 336,621.  Patented Feb. 23, 1886.

A soluble and an insoluble substance, which when moistened will set or agglomerate, like hydraulic cement and salt, which being lixiviated produces a porous body.

Attest:
W. E. Poulter
Paul M. Knobloch

Inventor:
August Breuer
per Henry Orth
his atty.

United States Patent Office.

AUGUST BREUER, OF DUISBURG, PRUSSIA, GERMANY, ASSIGNOR TO E. MATTHES & WEBER, OF SAME PLACE.

FILTER.

SPECIFICATION forming part of Letters Patent No. 336,621, dated February 23, 1886.

Application filed July 23, 1885. Serial No. 172,494. (No model.) Patented in Belgium May 26, 1885, No, 69,021; in France May 26, 1885, No. 169,168, and in England May 26, 1885, No. 6,414,

*To all whom it may concern:*

Be it known that I, AUGUST BREUER, a subject of the King of Prussia, residing at Duisburg, Prussia, German Empire, have invented certain new and useful Improvements in the Manufacture of Porous Bodies for Filtering or other Purposes; and I do hereby declare the following to be a full, clear, and exact description of the invention, such as will enable others skilled in the art to which it appertains to make and use the same.

This invention consists in a process of manufacturing or producing porous bodies for filtering purposes from cement or similar materials.

The media heretofore employed for filtration, diffusion, &c., composed of such substances or materials as clay, animal membrane, parchment-paper, and analogous media, very often fail in their operation, and this is especially the case when exposed to the action of caustic liquids.

The object of this invention is to produce porous bodies that will not fail in their operation when exposed to the action of caustic liquids.

Figure 1:
Figure 2:

In the accompanying drawings, Figure 1 illustrates a section of the filtering media before being rendered porous, and Fig. 2 illustrates a section of said media after being rendered porous.

In the manufacture of these bodies I employ cement or analogous materials, and obtain bodies of the required strength and porosity in the following manner: If cement or a mixture of cement and sand is allowed to agglomerate by mixing with water, a body is obtained that at first is slightly porous. This property, however, disappears rapidly and renders it unfit for the purposes in view. If, instead of mixing pure water with the cement or cement-and-sand compound, water containing soluble substances, or a liquid that will form a soluble combination with one or more of the constituents of the cement, is mixed therewith, a body of the required porosity may be obtained. Such a body (Fig. 1) will be composed after agglomeration and molding of soluble and insoluble constituents, the former of which may be washed out, thus leaving a perfectly porous body (Fig. 2) composed of insoluble substances chiefly or only, the body becoming honey-combed after the soluble constituents are washed out.

As a soluble ingredient, or as a solvent, I employ, among other substances, a solution of common salt, the degree of concentration of which is governed by the degree of porosity the body is to have, and by the addition of an acid—such as hydrochloric acid—the degree of porosity may be materially increased. After the setting or agglomeration of the material and the solidification of the body, whose shape will depend upon the conditions of use, and may be of any desired or appropriate shape, it is lixiviated in water, or this lixiviation may take place while the body is in use by the liquids to be filtered.

Having thus described my invention, what I claim is—

The described mode of producing porous bodies, which consists in combining an insoluble substance or substances that will agglomerate, set by the admixture therewith of a liquid, with a soluble substance or a solution of such, from which latter the soluble substance will separate in the process of agglomeration, or setting, or drying, allowing the compound to agglomerate or set or dry, and then removing the soluble substance by lixiviation, substantially as and for the purpose specified.

In testimony whereof I affix my signature in presence of two witnesses.

AUGUST BREUER.

Witnesses:
   TH. PIETMAN,
   Y. P. WALLENBOM.

Correction in Letters Patent No. 336,621.

It is hereby certified that in Letters Patent No. 336,621, granted February 23, 1886, upon the application of August Breuer, of Duisburg, Prussia, Germany, for an improvement in "Filters," an error appears in the printed specification requiring correction, as follows: In line 74, page 1, the comma after the word "agglomerate" should be stricken out and the word *or* inserted instead; and that the Letters Patent should be read with this correction therein that the same may conform to the record of the case in the Patent Office.

Signed, countersigned, and sealed this 9th day of March, A. D. 1886.

[SEAL.]

H. L. MULDROW,
*Acting Secretary of the Interior.*

Countersigned:
    M. V. MONTGOMERY,
        *Commissioner of Patents.*